Patented Dec. 25, 1945

2,391,799

UNITED STATES PATENT OFFICE 2,391,799

HYDANTOIN MANUFACTURE

Arthur O. Rogers, Lewiston, N. Y., assignor to E. I. du Pont de Nemours & Company, Wilmington, Del., a corporation of Delaware No Drawing. Application December 16, 1943, Serial No. 514,549

9 Claims. (Cl. 260—309.5)

This invention relates to the manufacture of hydantoins from ketones or aldehydes.

A well-known method for making hydantoins is to first react hydrocyanic acid with an aldehyde or a ketone in order to prepare the corresponding cyanhydrin and, after purification of the cyanhydrin, to add the latter to a solution of ammonium carbonate. For example, dimethyl hydantoin has been made by reacting acetone with hydrocyanic acid in the presence of a basic catalyst, purifying the resulting acetone cyanhydrin by distillation and adding the purified cyanhydrin slowly to a warm solution of ammonium carbonate. The acetone cyanhydrin reacts with the ammonium carbonate solution to produce a solution of dimethyl hydantoin from which the product may be recovered, for example, by cooling to precipitate hydantoin crystals. Good yields of high-purity product can be made by this two-step process.

An object of the present invention is to provide an improved method for making hydantoin by reacting an aldehyde or ketone with hydrocyanic acid and ammonium carbonate. A further object is to carry out the reaction in a single stage and thereby to obtain dimethyl hydantoin in high yield at lower cost. Further objects will be apparent from the following description of the invention.

The above objects are attained in accordance with the present invention by first forming a non-reacting mixture of hydrocyanic acid and the aldehyde or ketone to be reacted and adding this mixture to a solution of ammonium carbonate. Preferably, substantially equimolar proportions of the aldehyde or ketone and the hydrocyanic acid are used and the reaction between the hydrocyanic acid and the aldehyde or ketone is prevented by taking care that no basic material is present. The presence of a very small amount of alkali will act catalytically to cause the hydrocyanic acid to react more or less rapidly to form the cyanhydrin. If no alkaline material is present, the cyanhydrin reaction will occur only very slowly and the amount of material reacted will be practically negligible during a period of ten hours or less. Preferably, I add a small amount of acidic material to the mixture to insure the absence of any alkali and react the mixture with ammonium carbonate solution within a few hours.

In order to obtain high yields of the hydantoin, I have found that it is essential that the hydrocyanic acid and aldehyde or ketone are mixed together in such proportions that there is substantially not more than one mole of hydrocyanic acid for each mole of aldehyde or ketone in the mixture. If desired, an excess of aldehyde or ketone may be used, but the equimolar proportion is preferred. I have also found that it is not possible to obtain equally high yields by any other method of bringing the aldehyde or ketone and HCN and ammonium carbonate together under reacting conditions. For example, if acetone is first dissolved in ammonium carbonate solution and hydrocyanic acid slowly added to the solution, relatively low yields of hydantoin are obtained and undesirable by-products are formed in the solution. These by-products are especially undesirable when it is desired to pass steam through the reaction mixture to remove excess ammonia from the solution as these by-products cause undue foaming of the mixture. Likewise, the high yields obtainable by my invention cannot be obtained by adding aldehyde or ketone and HCN simultaneously in separate streams to an ammonium carbonate solution. In order to obtain the high yields and avoid the formation of by-products, it is essential that a mixture of hydrocyanic acid and the aldehyde or ketone be added to the ammonium carbonate solution. Preferably, the mixture is made under such conditions (i. e., non-alkaline conditions) that there is substantially no reaction between the ketone or aldehyde and the hydrocyanic acid to form cyanhydrin before the mixture is added to the ammonium carbonate. The presence of a small amount of cyanhydrin in the mixture is not particularly harmful. I have found, however, that the reaction of cyanhydrin with ammonium carbonate solution often gives somewhat lower yield of product than that obtained by the method of the present invention and hence I prefer to avoid cyanhydrin formation.

In adding an acid to prevent the hydrocyanic acid from reacting with the aldehyde or ketone, any acidic material which is substantially non-reactive towards the aldehyde or ketone and the HCN may be utilized. For example, I may use any of the common mineral acids such as hydrochloric acid, sulfuric acid, phosphoric acid, boric acid, or the like and I also may use organic acids such as acetic acid, propionic acid, benzoic acid, and the like. Salts which have acid reaction also may be used, for example, zinc chloride, zinc sulfate, sodium dihydrogen phosphate, and the like. I prefer to add a fairly strong acid and to a pH of 1 to 5. Excellent results have been obtained with phosphoric acid in amounts sufficient to give a pH of 2.2 to 2.5. However, substantially no cyanhydrin formation will occur at a pH of 7 or lower.

The following examples are specific illustrations of my invention:

Example 1

Powdered ammonium carbonate (1 mole, 96 g.) was dissolved in 100 cc. water in a 1-l. 3-necked flask. The solution was heated to 60° C., and an equimolar mixture of acetone and HCN (0.93 mole) added gradually with stirring over a 32-minute period at 60–66° C. The heat of reaction was sufficient to sustain the temperature after about ⅛ of acetone-HCN mixture had been added. Heating was continued for 1 hr. after completing the addition of reagents. Upon evaporation to constant weight on a steam-heated sand bath, 109 g. (91.6% of theoretical) of slightly yellow dimethyl hydantoin was obtained.

Example 2

An equimolar mixture of acetone and hydrocyanic acid was prepared and acidified to a pH of 2.2 to 2.5 by the addition of 85% phosphoric acid. A closed vessel equipped with a stirrer was charged with 23 parts by weight of water and 39 parts by weight of anhydrous ammonia. The resulting ammonia solution was warmed and a stream of carbon dioxide was passed into it. The mixture of acetone and hydrocyanic acid was then pumped to the resulting ammonium carbonate solution until 176 parts by weight of the mixture had been added, this requiring a time of about 104 hours. During this time the solution was constantly stirred, the introduction of carbon dioxide was continued at a rate sufficient to maintain a carbon dioxide pressure of 5 to 15 lbs. per sq. in. and the reaction temperature was maintained at 62 to 67° C.

When the addition of the acetone-hydrocyanic acid mixture was completed live steam was passed through the reaction mixture to drive off excess ammonia. The resulting concentrated solution of dimethyl hydantoin could be cooled to precipitate crystals of high purity dimethyl hydantoin; or the solution could be processed to make reaction products of the hydantoin, as desired. In a series of 10 operations by this method, an average yield of 99% was obtained, calculated on the hydrocyanic acid used.

In practicing my invention, I prefer to maintain the reaction mixture at a slightly elevated temperature, e. g. at 50 to 80° C. Generally best results are obtained at temperatures in the range of 60 to 75° C. At lower temperatures, the reaction proceeds more slowly. At higher temperatures, e. g. 90° C. and higher, it is preferable to operate in a closed vessel under appropriately high pressures.

My process is applicable to the production of hydantoins from any aldehydes or ketones which are capable of reacting with hydrocyanic acid to form cyanhydrins, which cyanhydrins react with ammonium carbonate to form hydantoins. In other words, my reaction may be applied to any of the compounds containing aldehyde or ketone groups which can be utilized to make hydantoin by the old method wherein a cyanhydrin is reacted with an ammonium carbonate solution. Such aldehydes and ketones may be aliphatic or aromatic, cylic or non-cyclic, or may contain both aromatic or aliphatic radicals. Specific examples of aldehydes and ketones which may be used in practicing my invention are: acetaldehyde, butyraldehyde, iso-butyraldehyde, phenyl acetaldehyde, benzaldehyde, acetone, methyl ethyl ketone, methyl isobutyl ketone, methyl amyl ketone, actophenone, benzophenone, diphenyl acetone, diacetyl, acetoacetic ester, cyclohexanone, and phenyl ethyl ketone. The invention is not restricted to the above aldehydes and ketones, which illustrate the various types suitable for practicing my novel process. I may employ any organic compound having at least two carbon atoms and which contains one or more carbonyl groups joined either to two carbon atoms (ketonic), or to one carbon atom and one hydrogen atom (aldehydic). Such compounds may be represented by the formula

where X is an organic radical joined to the carbonyl group by a carbon to carbon linkage and Y is either an organic radical like X or hydrogen.

I claim:

1. The process for the manufacture of a hydantoin which comprises preparing a non-alkaline mixture of hydrocyanic acid and a carbonyl compound having the formula:

wherein X stands for an organic radical joined to the carbonyl group by a carbon-carbon linkage and Y stands for hydrogen and an organic radical joined to the carbonyl group by a carbon-carbon linkage, said mixture containing at least one mole of said carbonyl compound for each mole of hydrocyanic acid, and reacting said mixture with an aqueous solution of ammonium carbonate.

2. The process for the manufacture of a hydantoin which comprises preparing a non-alkaline mixture of hydrocyanic acid and an aldehyde having at least two carbon atoms, said mixture containing at least one mole of said aldehyde for each mole of hydrocyanic acid, and reacting said mixture with an aqueous solution of ammonium carbonate.

3. The process for the manufacture of a hydantoin which comprises preparing a non-alkaline mixture of hydrocyanic acid and a ketone, said mixture containing at least one mole of said ketone for each mole of hydrocyanic acid, and reacting said mixture with an aqueous solution of ammonium carbonate.

4. The process for the manufacture of a hydantoin which comprises preparing a non-alkaline mixture of hydrocyanic acid and acetone, said mixture containing at least one mole of said acetone for each mole of hydrocyanic acid, and contacting said mixture with an aqueous solution of ammonium carbonate.

5. The process of claim 1 wherein said mixture is gradually added to said carbonate solution with stirring and the temperature of the reacting mixture is maintained at about 50 to 80° C.

6. The process for the manufacture of a hydantoin which comprises preparing a substantially non-alkaline equimolar mixture of hydrocyanic acid and a carbonyl compound selected from the group consisting of ketones and aldehydes having at least two carbon atoms and reacting said mixture with an aqueous solution of ammonium carbonate.

7. The process for the manufacture of a hydantoin which comprises preparing a substantially non-alkaline equimolar mixture of hydrocyanic acid and acetone and reacting said mixture with an aqueous solution of ammonium carbonate at a temperature of 50 to 80° C.

8. The process according to claim 6 wherein said mixture is acidified by the addition of an acid stronger than hydrocyanic acid.

9. The process according to claim 7 wherein said mixture is acidified by the addition of phosphoric acid sufficient to adjust the pH at 1 to 5.

ARTHUR O. ROGERS.